United States Patent

Anderson et al.

[11] Patent Number: 4,587,571
[45] Date of Patent: May 6, 1986

[54] READ AND ERASE DEVICE

[75] Inventors: Alan F. Anderson, Horley; Robert W. Easterby, Dartford, both of England

[73] Assignee: Mainmet Limited, Bradford, England

[21] Appl. No.: 742,382

[22] Filed: Jun. 10, 1985

Related U.S. Application Data

[63] Continuation of Ser. No. 458,151, Jan. 14, 1983, abandoned.

[30] Foreign Application Priority Data

Jan. 29, 1982 [GB] United Kingdom ............... 8202639

[51] Int. Cl.$^4$ .................. G11B 25/04; G06K 13/06; G06K 13/063
[52] U.S. Cl. ........................ 360/2; 235/483; 235/485
[58] Field of Search ............... 235/483, 485

[56] References Cited

U.S. PATENT DOCUMENTS

| | | | |
|---|---|---|---|
| 3,752,962 | 8/1973 | Greskovics | 360/2 |
| 3,787,661 | 1/1974 | Moorman et al. | 235/61.11 D |
| 3,801,804 | 4/1974 | Von Glahn et al. | 360/2 |
| 3,836,753 | 9/1974 | Pass | 360/2 |
| 3,885,130 | 5/1975 | Mouton | 360/2 |
| 3,898,432 | 8/1975 | Agnew et al. | 360/2 |
| 4,020,325 | 4/1977 | Pfost et al. | 235/61.7 B |
| 4,085,313 | 4/1978 | Van Ness | 235/381 |
| 4,151,564 | 4/1979 | Schreiber et al. | 360/2 |
| 4,197,989 | 4/1980 | Pearce | 360/2 |
| 4,239,151 | 12/1980 | Enser et al. | 360/2 |
| 4,300,041 | 11/1981 | Nama | 235/449 |
| 4,361,754 | 11/1982 | Hoskinson | 235/381 |
| 4,381,524 | 4/1983 | Shay et al. | 360/2 |

FOREIGN PATENT DOCUMENTS

| | | | |
|---|---|---|---|
| 2806390 | 9/1978 | Fed. Rep. of Germany | 360/2 |
| 1562959 | 3/1969 | France | 235/61 |
| 2050861 | 3/1971 | France | 235/61.7 |
| 1181842 | 2/1970 | United Kingdom | 235/61.7 |
| 1457853 | 12/1976 | United Kingdom | 235/61.7 |
| 1494736 | 12/1977 | United Kingdom | 235/61.7 |
| 1558521 | 1/1980 | United Kingdom | 235/61.7 |

Primary Examiner—Vincent P. Canney
Attorney, Agent, or Firm—Kerkam, Stowell, Kondracki & Clarke

[57] ABSTRACT

This invention relates to a device adapted to read and erase magnetically encoded information on a ticket or card. A compact self-contained device is provided for attachment to a local utility meter (e.g. electricity meter) or a gas meter. The device comprises a compact casing 10 which is attached to an electrical drive motor 11 which, via roller 9, drives a drive roller 13. The casing 10 includes an entry mouth 18 which leads to a flow path 19 passing between the drive roller 13 and a pinch roller 15 and terminating in an exit mouth 20. Adjacent the entry mouth 18 are sensors 21, adapted to energize the motor 11 when a card is pushed into the entry mouth 18. Similarly adjacent the exit mouth 20 are sensors incorporating switches 22 which may be used to de-energize or reverse the motor. A magnetic read-head 25 is located within the casing 10 and is adapted to read information magnetically recorded on the card or ticket as it flows along the flow path 19. An erase head 23 may also be provided.

12 Claims, 3 Drawing Figures

READ AND ERASE DEVICE

This application is a continuation of Application Ser. No. 458,151, filed Jan. 14, 1983 now abandoned.

This invention relates to a read and erase device adapted to read and erase magnetically encoded information on a ticket or card such as a ticket used on a public transport system or a credit card or identification card or similar cards containing coded information.

An object of the invention is to provide a compact self-contained device which may for example be attached to a local utility meter such as an electricity meter, a meter used in a district heating system, or a gas meter. The device may also be used in a system where recognition and identification is required, for example in fare collection or in card controlled locking systems such as are used in garages and car parks.

In accordance with the invention there is provided apparatus including a compact read and erase device, for reading and erasing magnetically encoded information on a ticket or card, the device comprises a single unit incorporating an electric drive motor, and a read head and system of drive and pinch rollers for passing a ticket or card from an entry slot to a read head and then, optionally, to an erase head, or to a combined read/erase head, the whole device being in compact unitary self contained form and adapted to be attached to an existing meter or the like. The device may for instance be used in the credit card system described in our copending patent application No. 8137197 which requires a token reader to be attached to a commodity dispensing equipment such as a hot water meter employed in a district heating system.

Such systems may operate by a combination of identity cards and value cards and the device in accordance with this invention may be adapted to read both types of cards and produce an output which in turn may be used to operate a meter mechanism which supplies the appropriate quantity of the hot water or other utility being dispensed.

The device may also be used for example on the entry gate of a public transport system such as an underground railway system and may be equally adapted to and used with existing automated gates.

Preferably the device comprises a single compact casing providing the flow path for the ticket or credit card, the flow path having a drive roller and one or more pinch rollers to propel the card or ticket through the device, a magnetic read head for reading the information on the card, and optionally a magnetic erase head which may be combined with the read head for removing information recorded on the card. The drive roller may be driven by a small electric motor attached to or forming an integral part of the device and there may be entry and exit switches to energise and de-energise the motor and to control its direction as the card or ticket enters and leaves the device.

Figure 1:
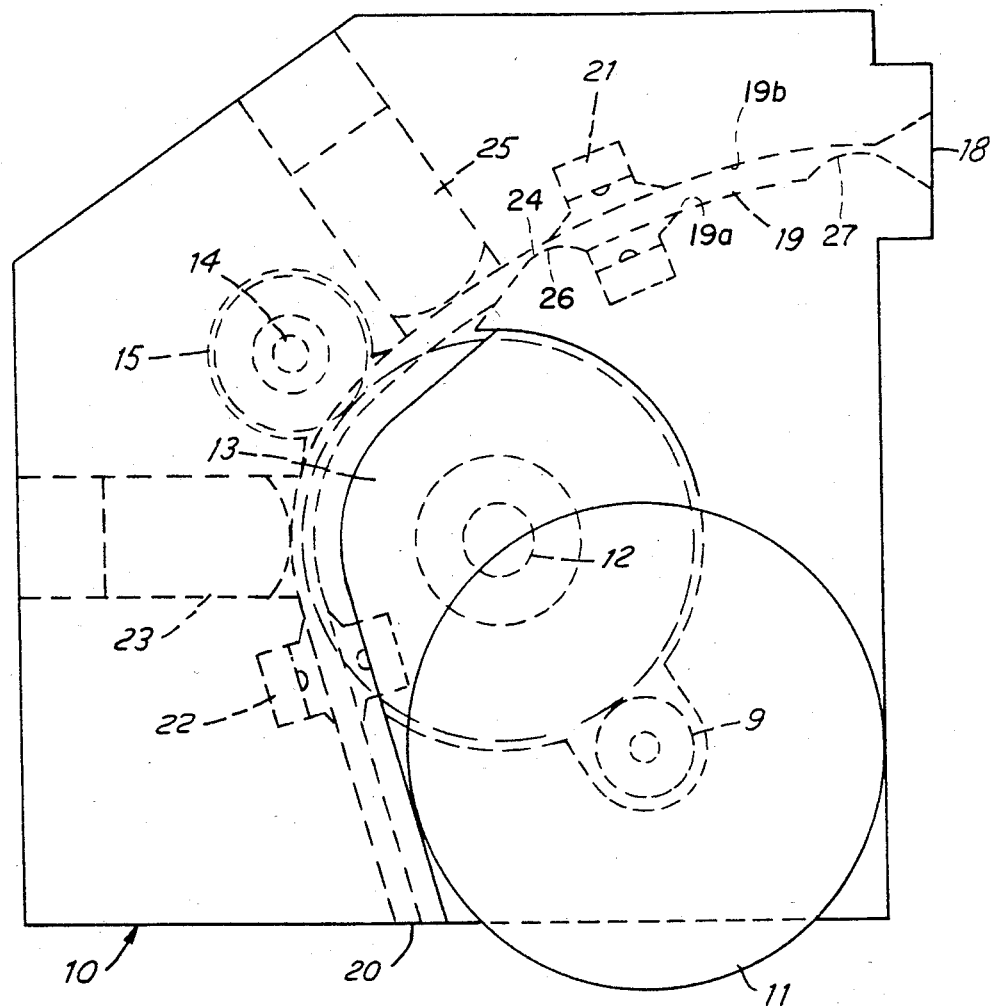
FIG. 1 is a front elevation of a read and erase device in accordance with this invention with parts removed and other parts shown in dotted line to illustrate the internal construction.
Figure 2:
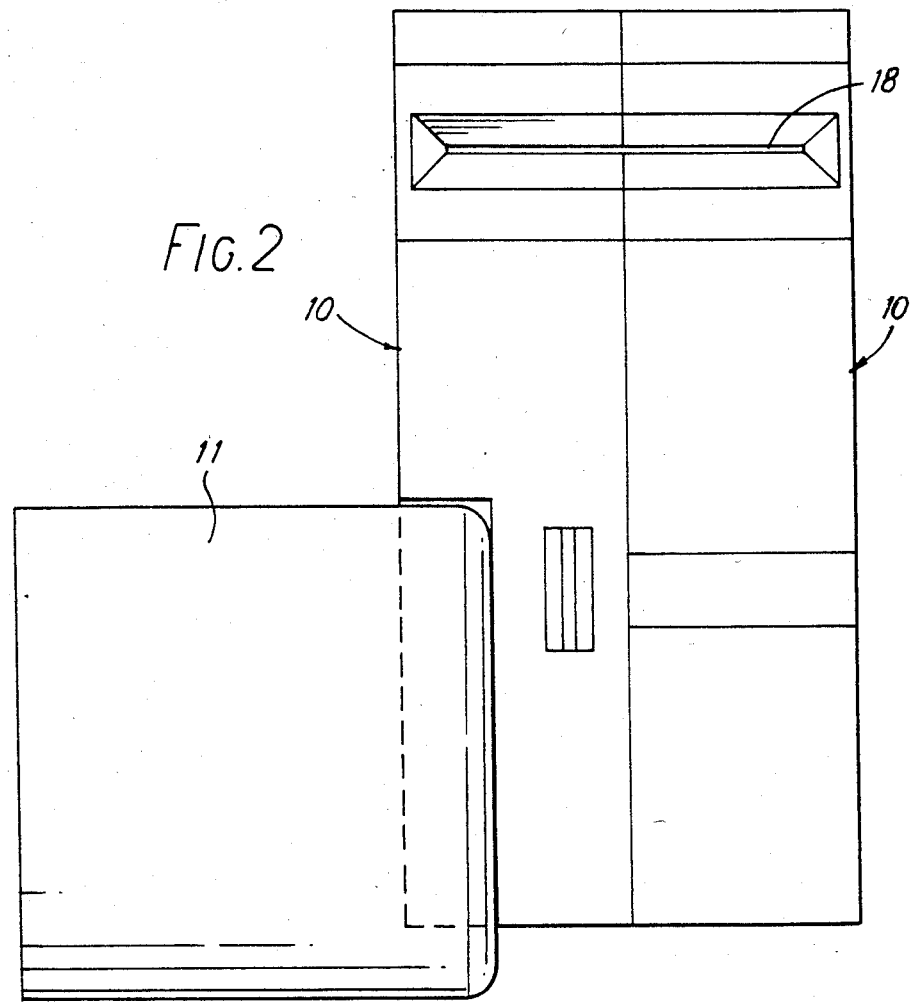
FIG. 2 is a side elevation of the same device.

The device comprises a compact casing 10 which is attached to an electrical drive motor 11 which, via a roller 9, drives a drive roller 13 which is mounted on a shaft 12. Within the casing 10 on a shaft 14 is mounted a pinch roller 15 (FIG. 1). The casing 10 includes an entry mouth or slot 18 which leads to a flow path 19 passing between the drive roller 13 and the pinch roller 15. The flow path 19, which is defined by first and second internal wall portions 19a and 19b, respectively, of the casing, terminates in an exit mouth or slot 20. Adjacent the entry mouth 18 are sensors 21, which may be optical sensors, and which incorporate switches adapted to energise the motor 11 when a card is pushed into the entry mouth 18. Similarly adjacent the exit mouth 20 are sensors incorporating switches 22 which may be used to de-energise the motor at the end of the cycle or to reverse the motor and return the card to the entry mouth 18.

A magnetic read-head 25 is located within the casing 10 in the second wall portion 19b, and is adapted to read information magnetically recorded on the card or ticket as it flows along the flow path 19.

An erase head 23 may also be provided as shown in FIG. 1. The erase head may be combined with the read head in a single unit located at the position of read head 25.

As shown in FIG. 1, flow path 19 may be substantially continuously curved between entry mouth 18 and exit mouth 20, and the read and erase heads may be located at the outer curvature of the path. As is also shown in the figure, flow path 19 may have a constriction 24 therein located adjacent to read head 25 and disposed between sensors 21 and the read head, the construction being formed by a bump or projection 26 in the first wall portion 19a of the casing. This arrangement constricts the flow path prior to the card or ticket passing the read head. Another bump or projection 27 may form another constriction in the flow path just inside the entry mouth 18, as shown.

In use this device can be attached to a meter, a control gate, or a similar mechanism and when a card or ticket is pushed into the entry mouth the switches 21 are energised to switch on the motor 11 which, via roller 9, drives the drive roller 13 so as to cause the ticket or card to move along the flow path 19 between the drive roller 13 and pinch roller 15. As the card or ticket passes the magnetic read head 25 the information on the card or ticket will be read and, if the erase device is used the information on the card or ticket will be erased as it passes the erase device 23. As the ticket or card exits through the exit mouth it will pass the sensors 22 which will switch off the motor and stop operation of the device.

Figure 3:
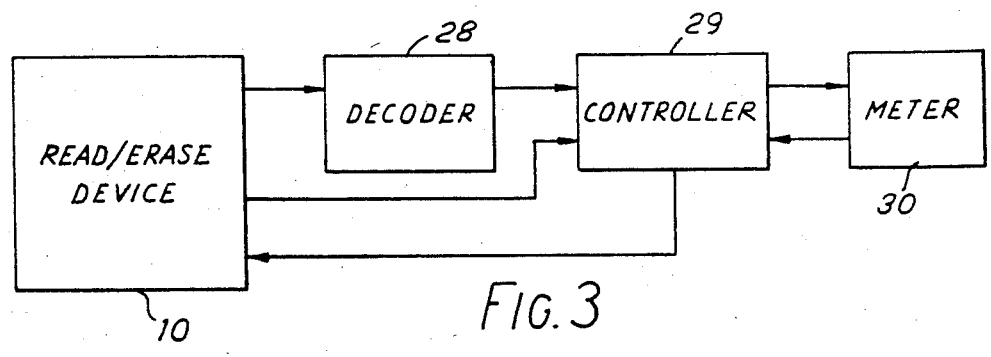
FIG. 3 is a block diagram of apparatus with which the read and erase device may be used.

Alternatively after the card or ticket information has been interpreted, the motor 11 may be reversed so as to propel the card or ticket back along the flow path 19 towards the entry mouth 18 and the sensing device 21 would be used to switch off the motor and stop operation of the device. A typical use of the device by which a credit card may be employed for prepayment of charges for use of electricity is shown in FIG. 3.

The read and erase device 10 is connected to a decoder 28 in turn connected via a controller 29 to the electricity meter 30. The controller may perform several functions. Initially it may compare a code on the card with a pre-set code on the controller and either accept or reject the card. If the card is accepted it may then set a mechanism in the meter to allow a predetermined amount of electricity to be used. It may also operate a counter to record the total electricity is used.

The output from this device may be fed to appropriate logic circuits so as to operate the mechanism to which the device is attached.

Having thus described our invention what we claim is:

1. Apparatus for reading magnetically encoded information on a ticket or card, comprising a compact casing having an entry slot, an exit slot, and first and second internal wall portions defining therebetween within the casing a substantially continuously curved path connecting the entry and exit slots for a ticket or card inserted into the entry slot, the first wall portion defining an inner curvature of the curved path and the second wall portion defining an outer curvature of the curved path; a read head located within the second wall portion at the outer curvature of the path for reading the magnetically encoded information on the ticket or card; a drive roller and a pinch roller in engagement with one another and disposed along the path for conveying the ticket or card from the entry slot past the read head; an electric drive motor for driving the drive roller; and a projection formed as part of said first internal wall portion defining a constriction in the path adjacent to the read head.

2. The apparatus of claim 1, wherein the drive roller and the pinch roller are disposed along the path after the read head.

3. The apparatus of claim 1, wherein the electric drive motor has a roller which engages the drive roller for driving the drive roller, and said electric drive motor, said driver roller, and said pinch roller comprise the only moving parts in the apparatus.

4. The apparatus of claim 1, further comprising an erase head disposed along the path for erasing said magnetically coded information.

5. The apparatus of claim 4, wherein the read head and the erase head are combined in a single read and erase head.

6. The apparatus of claim 1, further comprising sensors disposed along the path for sensing the ticket or card and for controlling the electric drive motor.

7. The apparatus of claim 6, wherein said sensors comprise entry and exit sensors for energizing and de-energizing the electric drive motor and for controlling its direction of rotation.

8. The apparatus of claim 1, further comprising another projection formed as part of said first internal wall portion defining another constriction in the path adjacent to the entry slot.

9. Apparatus for controlling dispensing equipment comprising a read and erase device for reading and erasing magnetically encoded information on a ticket or card, the device comprising a compact casing having an entry opening for receiving the ticket or card, an exit opening, and first and second internal wall portions defining therebetween, a substantially continuously curved path connecting the entry and exit openings, the first wall portion defining an inner curvature of the path and the second wall portion defining an outer curvature of the path; a read head located within the second wall portion at the outer curvature of the path for reading the magnetically encoded information on the ticket or card; an erase head located within the second wall portion at the outer curvature of the path for erasing the magnetically encoded information on the ticket or card; a drive roller and a pinch roller in engagement with one another and disposed along the path for conveying the ticket or card from the entry opening to the exit opening; an electric drive motor for driving the drive roller; an entry sensor disposed along the path between the entry opening and the read head for sensing the ticket or card and for controlling the electric drive motor; and a projection formed as part of said first internal wall portion defining a constriction in the path adjacent to the read head and between the read head and the entry sensor.

10. The apparatus of claim 9, wherein the electric drive motor has a roller which can engages said drive roller, and the electric drive motor, the drive roller, and the pinch roller comprise the only moving parts of the device.

11. The apparatus of claim 9 further comprising another projection formed as part of said first internal wall portion defining another constriction in the path between the entry sensor and the entry opening.

12. The apparatus of claim 9 further comprising an exit sensor disposed adjacent to the exit opening for sensing the ticket or card, and wherein the entry and exit sensors cooperate to control the direction of rotation of the electric drive motor.

* * * * *